(12) United States Patent
Wen

(10) Patent No.: US 11,518,035 B2
(45) Date of Patent: Dec. 6, 2022

(54) METHOD AND APPARATUS FOR CONTROLLING ROBOT, METHOD AND APPARATUS FOR PROVIDING SERVICE, AND ELECTRONIC DEVICE

(71) Applicant: CLOUDMINDS ROBOTICS CO., LTD., Shanghai (CN)

(72) Inventor: Yanfei Wen, Guangdong (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 597 days.

(21) Appl. No.: 16/660,860

(22) Filed: Oct. 23, 2019

(65) Prior Publication Data
US 2020/0086490 A1 Mar. 19, 2020

Related U.S. Application Data

(63) Continuation of application No. PCT/CN2017/084033, filed on May 11, 2017.

(51) Int. Cl.
*G06F 16/178* (2019.01)
*G06F 16/11* (2019.01)
(Continued)

(52) U.S. Cl.
CPC ........... *B25J 9/1689* (2013.01); *B25J 13/006* (2013.01); *G06F 9/45558* (2013.01);
(Continued)

(58) Field of Classification Search
CPC ................................................. G06F 9/45595
See application file for complete search history.

(56) References Cited

U.S. PATENT DOCUMENTS 8,406,926 B1 * 3/2013 Lewis ................... G06Q 30/02
700/259
2012/0254108 A1 * 10/2012 Wedewer ................ H04W 4/60
707/610

(Continued)

FOREIGN PATENT DOCUMENTS

CN 101655798 A 2/2010
CN 103546988 A 1/2014
(Continued)

OTHER PUBLICATIONS

Cloudminds (Shenzhen) Robotics Systems Co., Ltd., CN First Office Action, CN 201780000706.X, dated Jun. 2, 2021, 18 pgs.

(Continued)

*Primary Examiner* — Edward J Dudek, Jr.
(74) *Attorney, Agent, or Firm* — Heslin Rothenberg Farley & Mesiti, PC

(57) ABSTRACT

The present disclosure provides a method and an apparatus for controlling a robot, a method and an apparatus for providing service and an electronic device. The method comprises: creating, by a local robot, a file system snapshot of an application in a local operating system, and synchronizing file system data of the application to a cloud robot; running, by the cloud robot, on a cloud virtual machine pre-running the same operating system as that of the local robot, the same application as that of the local robot (101); and reversely synchronizing a running result of the application to the local robot (102).

16 Claims, 7 Drawing Sheets

(51) Int. Cl.
*G06F 9/455* (2018.01)
*B25J 9/16* (2006.01)
*B25J 13/00* (2006.01)

(52) U.S. Cl.
CPC .......... *G06F 16/128* (2019.01); *G06F 16/178* (2019.01); *G06F 2009/45595* (2013.01)

(56) References Cited

U.S. PATENT DOCUMENTS

| 2013/0166621 | A1* | 6/2013 | Zhu | B25J 9/161 |
| | | | | 901/50 |
| 2015/0081636 | A1* | 3/2015 | Schindler | G06F 11/1482 |
| | | | | 707/639 |
| 2018/0288137 | A1* | 10/2018 | Veeramani | H04L 67/34 |

FOREIGN PATENT DOCUMENTS

| CN | 104660660 A | 5/2015 |
| CN | 204539312 U | 8/2015 |
| CN | 105227336 A | 1/2016 |
| CN | 105563484 A | 5/2016 |
| CN | 105897509 A | 8/2016 |
| CN | 106095115 A | 11/2016 |
| CN | 106302759 A | 1/2017 |
| CN | 106452903 A | 2/2017 |
| CN | 106534283 A | 3/2017 |
| CN | 106534338 A | 3/2017 |
| EP | 2360589 A1 | 3/2006 |
| JP | 2013152541 A | 8/2013 |
| JP | 2013171579 A | 9/2013 |
| JP | 2015138292 A | 7/2015 |
| WO | 2014125643 A1 | 8/2014 |

OTHER PUBLICATIONS

International Search Report (and English translation) and Written Opinion of the International Searching Authority for International Application No. PCT/CN2017/084033 dated Feb. 9, 2018.
Extended European Search Report for European Patent Application No. 17909637.5 dated Mar. 20, 2020.
Kosta, S., et al., "ThinkAir: Dynamic resource allocation and parallel execution in the cloud for mobile code offloading", INFOCOM, 2012 Proceedings IEEE, IEEE, Mar. 25, 2012, pp. 945-953, XP03217206, DOI: 10.1109/INFCOM.2012.6195845, ISBN: 978-1-4673-0773-4.
Cuervo, E., et al., "MAUI: Making Smartphones Last Longer with Code Offload", Proceedings of the 8th International Conference on Mobile Systems, Applications, and Services (MOBISYS 2010), San Francisco, California, USA, Jun. 15-18, 2010, ACM, New York, NY, Jun. 15, 2010, pp. 49-62, XP058254756, DOI: 10.1145/181433. 1814441, ISBN: 978-1-60558-985-5.

* cited by examiner

METHOD AND APPARATUS FOR CONTROLLING ROBOT, METHOD AND APPARATUS FOR PROVIDING SERVICE, AND ELECTRONIC DEVICE

CROSS REFERENCE TO RELATED APPLICATIONS

The present disclosure is a continuation of international application No. PCT/CN2017/084033, filed on May 11, 2017, and titled "METHOD AND APPARATUS FOR CONTROLLING ROBOT, METHOD AND APPARATUS FOR PROVIDING SERVICE, AND ELECTRONIC DEVICE", which is incorporated herein by reference in its entirety.

TECHNICAL FIELD

The present disclosure relates to cloud robot technology, in particular to a method and an apparatus for controlling a robot, a method and an apparatus for providing service, and an electronic device.

BACKGROUND

A core technology of a cloud intelligent robot is to put the robot's brain in a cloud, a local robot is connected to a cloud intelligent terminal controller, and as an entity of the robot, the terminal controller is connected to the brain in the cloud via a high-speed secured network. All artificial intelligence of the local robot is acquired from the cloud by the terminal controller via the high-speed secured network, that is, the artificial intelligence in the cloud controls all behaviors of the local robot.

However, in existing technologies, the artificial intelligence in the cloud cannot achieve fully automatic control, that is, a control rate of 100% and a control on the behaviors of the entity of the robot is not ideal.

SUMMARY

One objective of embodiments of the present disclosure is to further improve a control, by a cloud, on behaviors of a robot entity, enabling the robot entity to provide better service.

In a first aspect, embodiments of the present disclosure provide a method for controlling a robot, which includes:

running, on a virtual machine pre-running the same operating system as that of a local robot, the same application as that of the local robot, where a file system data of the application is synchronized by the local robot in advance.

reversely synchronizing a running result of the application to the local robot.

In a second aspect, embodiments of the present disclosure provide an apparatus for controlling a robot, which includes:

an application running module, configured to run, on a cloud virtual machine pre-running the same operating system as that of a local robot, the same application as that of the local robot, where a file system data of the application is synchronized by the local robot in advance;

a reverse synchronization module, configured to reversely synchronize a running result of the application to the local robot.

In a third aspect, embodiments of the present disclosure provide an electronic device, which includes: a memory, one or more processors and one or more modules;

the one or more modules are stored in the memory and configured to be executed by the one or more processors, and the one or more modules include instructions for performing each step in the forgoing method for controlling a robot.

In a fourth aspect, embodiments of the present disclosure provide a computer program product which includes a computer program embedded in a computer readable storage medium, where the computer program includes instructions for causing an electronic device to perform each step in the method for controlling a robot as above mentioned.

The above-mentioned embodiments have advantages as follows.

In a solution for controlling a robot provided in embodiments of the present disclosure, the application of the local robot is synchronized to the cloud in advance, then the same application as that of the local robot is run on the cloud virtual machine running the same operating system as that of the local robot, and a running result of the application is reversely synchronized to the local robot. In this way, the cloud can achieve remote operation on the application of the terminal, and an ability of the cloud can be further improved to control the behaviors of the local robot.

In a fifth aspect, embodiments of the present disclosure provide a method for providing service, which includes:

creating a file system snapshot of an application in a local operating system, and synchronizing a file system data of the application to a cloud robot;

receiving a running result of the application reversely synchronized by the cloud robot.

In a sixth aspect, embodiments of the present disclosure provide an apparatus for providing service, which includes:

a synchronization module, configured to create a file system snapshot of an application in a local operating system, and synchronize a file system data of the application to a cloud robot;

a local first receiving module, configured to receive a running result of the application reversely synchronized by the cloud robot.

In a seventh aspect, embodiments of the present disclosure provide an electronic device, which includes: a memory, one or more processors and one or more modules;

the one or more modules are stored in the memory and configured to be executed by the one or more processors, and the one or more modules include instructions for performing each step in the forgoing method for providing service.

In an eighth aspect, embodiments of the present disclosure provide a computer program product which includes a computer program embedded in a computer-readable storage medium, where the computer program includes instructions for causing the electronic device to perform each step in the method for providing service as above mentioned The above-mentioned embodiments have advantages as follows.

In a solution for providing service for a robot provided in embodiments of the present disclosure, the local robot of the present disclosure may create a file system snapshot of the application in the local operating system, synchronize the file system data of the application to the cloud robot, and performs operations such as processing and running the application through the cloud robot, so the local robot only needs to receive the running result of the application reversely synchronized by the cloud robot. In this way, the cloud can achieve remote operation on the application of the terminal, the ability of the cloud can be further improved to control behaviors of the local robot and the local robot can further provide better service to a user.

BRIEF DESCRIPTION OF THE DRAWINGS

Embodiments of the present disclosure will be described in detail below with reference to the accompanying drawings:

FIG. 3-1 shows a first schematic structural diagram of an apparatus for controlling a robot in a third embodiment of the present disclosure;

FIG. 3-2 shows a second schematic structural diagram of the apparatus for controlling a robot in the third embodiment of the present disclosure;

FIG. 3-3 shows a third schematic structural diagram of the apparatus for controlling a robot in the third embodiment of the present disclosure;

FIG. 4-1 shows a first schematic structural diagram of an apparatus for providing service in a fourth embodiment of the present disclosure;

FIG. 4-2 shows a second schematic structural diagram of the apparatus for providing service in the fourth embodiment of the present disclosure;

FIG. 4-3 shows a third schematic structural diagram of the apparatus for providing service in the fourth embodiment of the present disclosure;

FIG. 4-4 shows a fourth schematic structural diagram of the apparatus for providing service in the fourth embodiment of the present disclosure;

FIG. 4-5 shows a fifth schematic structural diagram of the apparatus for providing service in the fourth embodiment of the present disclosure;

FIG. 5 shows a schematic structural diagram of an electronic device in a fifth embodiment of the present disclosure;

DETAILED DESCRIPTION

In order to make technical solution and advantages of the present disclosure clearer, exemplary embodiments of the present disclosure will be explained below in detail with reference to accompanying drawings and embodiments. Obviously, the described embodiments are only some embodiments of the present disclosure rather than all embodiments. Features in the embodiments and the embodiments in the description may be combined with each other without contradiction.

In view of deficiencies of existing technologies, embodiments of the present disclosure provide such a method and an apparatus for controlling a robot, and a method and an apparatus for providing service, and an electronic device as described below.

A First Embodiment

Figure 1:
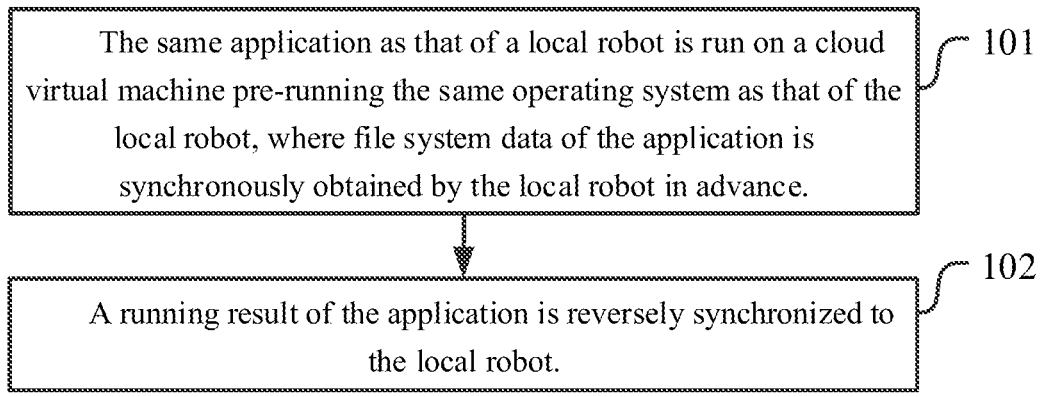
FIG. 1 shows a schematic flowchart of implementation of a method for controlling a robot in a first embodiment of the present disclosure.

FIG. 1 shows a schematic flowchart of implementation of a method for controlling a robot in the first embodiment of the present disclosure. As shown in the figure, the method for controlling a robot may include the following steps.

At step 101, the same application as that of a local robot is run on a cloud virtual machine pre-running the same operating system as that of the local robot. Herein, file system data of the application is synchronized by the local robot in advance;

At step 102, a running result of the application is reversely synchronized to the local robot.

This embodiment is described from a cloud robot side. The cloud robot may pre-establish one or more cloud virtual machines having the same operating system as that of the local robot, and is synchronized with the application by the local robot, so that the same application as that of the local robot may be run on the virtual machine in the cloud, and after the running is completed, the cloud robot reversely synchronizes the running result to the local robot. In this way, the cloud can achieve remote operation and control on the application of the terminal, the ability of the cloud can be further improved to control behaviors of the local robot and the local robot can further provide better service to a user.

In a specific implementation, the virtual machine of the cloud robot may adopt the same operating system kernel, for example, Linux Kernel, as the local robot. The cloud virtual machine of the cloud robot may adopt the same operating system, for example, Android System, as the local robot. The application may be various applications in the existing technologies, and the present disclosure does not enumerate all examples herein.

In implementation, before running the same application as that of the local robot on the cloud virtual machine pre-running the same operating system as that of the local robot, the method further includes:

receiving the file system data of the application synchronized by the local robot, where the file system data of the application synchronized by the local robot is obtained by creating a file system snapshot of the application in a local operating system by the local robot; and starting the cloud virtual machine, and running the same operating system as that of the local robot on the cloud virtual machine and loading the file system data.

In a specific implementation, before the cloud robot runs the same application as that of the local robot, the cloud may receive the file system data of the application synchronized by the local robot first, then start the virtual machine, run the same operating system as that of the local robot on the cloud virtual machine and load the file system data of the application.

Herein, the file system data of the application synchronized by the local robot and received by the cloud robot may be obtained by creating a file system snapshot for the application in the local operating system by the local robot. In this embodiment, the local robot may support the file system snapshot, create the file system snapshot at any time, and upload the snapshot of the file system or data of the application to the cloud server.

In implementation, before receiving the file system data of the application synchronized by the local robot, the method further comprises:

sending an instruction for synchronizing an application to the local robot.

In a specific implementation, the cloud robot may further send the instruction for synchronizing the application to the local robot before receiving the file system data of the application synchronized by the local robot. After receiving the instruction for synchronizing the application, the local robot synchronizes the data of the application to the cloud server in accordance with the instruction for synchronizing the application.

In this embodiment, the local robot may determine the data of the application to be synchronized to the cloud, or may synchronize the data of the application to the cloud in accordance with the instruction after receiving the instruction for synchronizing the application sent by the cloud.

In a solution for controlling a robot provided in this embodiment, the application of the local robot is synchronized to the cloud in advance, then the same application as that of the local robot is run on the cloud virtual machine running the same operating system as that of the local robot, and the running result of the application is reversely synchronized to the local robot. In this way, the cloud can achieve remote operation of the application of a terminal, and an ability of the cloud can be further improved to control the behaviors of the local robot.

A Second Embodiment

Figure 2:
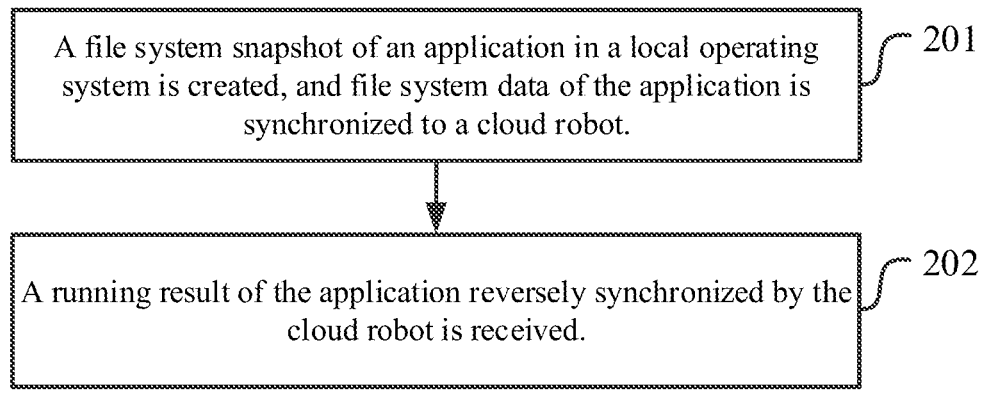
FIG. 2 shows a schematic flowchart of implementation of a method for providing service in a second embodiment of the present disclosure.

FIG. 2 shows a schematic flowchart of implementation of a method for providing service in the second embodiment of the present disclosure. As shown in the figure, the method for providing service may include the following steps.

At step 201, a file system snapshot of an application in a local operating system is created, and a file system data of the application is synchronized to a cloud robot.

At step 202, a running result of the application reversely synchronized by the cloud robot is received.

This embodiment is explained from a local robot side. The local robot may create the file system snapshot of the application in the local operating system, and then synchronize the file system data of the application to a cloud server or a cloud robot. After the cloud robot finishes processing the file system data, the local robot only needs to receive the running result of the application reversely synchronized by the cloud robot. By adopting the solution provided in this embodiment, the cloud may remotely control the application of the local robot, thereby the local robot may provide better service to a user.

In implementation, before creating the file system snapshot of the application in the local operating system, the method further includes:

receiving an instruction for synchronizing an application sent by the cloud robot.

In a specific implementation, the local robot may receive the instruction for synchronizing the application sent by the cloud robot before creating the file system snapshot of the application in the local operating system, create a snapshot of the local application in accordance with the instruction for synchronizing the application and synchronize the file system data to the cloud robot.

In a specific implementation, the local robot may initiate synchronization if needed, or initiate the synchronization if the user requires.

In implementation, after receiving the instruction for synchronizing the application sent by the cloud robot and before the creating the file system snapshot of the application in the local operating system, the method further includes:

locking the application.

In a specific implementation, after receiving the instruction for synchronizing the application sent by the cloud robot and before the creating the file system snapshot of the application in the local operating system, the local robot may lock the application to be synchronized to prevent the file system data of the local application from changing during the synchronization or the cloud robot running the application, thereby avoiding causing an error in the running result.

In implementation, after receiving the running result of the application reversely synchronized by the cloud robot, the method may further include:

unlocking the application.

In a specific implementation, after the cloud robot finishes running the application and the local robot receives the running result of the application synchronized reversely by the cloud robot, the local robot may unlock the local application so that the local robot can run the local application or the user can normally use the local application.

In implementation, after receiving the running result of the application reversely synchronized by the cloud robot, the method may further include:

displaying the running result.

In a specific implementation, after receiving the running result of the application reversely synchronized by the cloud robot, the local robot may display the running result on a display screen of the local robot so as to provide service to the user.

In a specific implementation, after receiving the running result of the application reversely synchronized by the cloud robot, the local robot may otherwise inform the user of the running result by outputting a voice or the like, and may otherwise automatically execute an action corresponding to the running result.

In a solution for providing service for a robot provided in this embodiment, the local robot of the present disclosure may create a file system snapshot of the application in the local operating system, synchronize the file system data of the application to the cloud robot, and performs operations such as processing and running the application through the cloud robot, so the local robot only needs to receive the running result of the application reversely synchronized by the cloud robot. In this way, the cloud can achieve remote operation of the application of a terminal, the ability of the cloud can be further improved to control behaviors of the local robot and the local robot can further provide better service to the user.

A Third Embodiment

Based on the same inventive concept, embodiments of the present disclosure further provide an apparatus for controlling a robot. Since the principle of the solution with respect to the apparatus is similar to that of the method for controlling a robot, implementations of the apparatus may refer to the implementations of the method and are not repeated here.

Figures 1, 3:
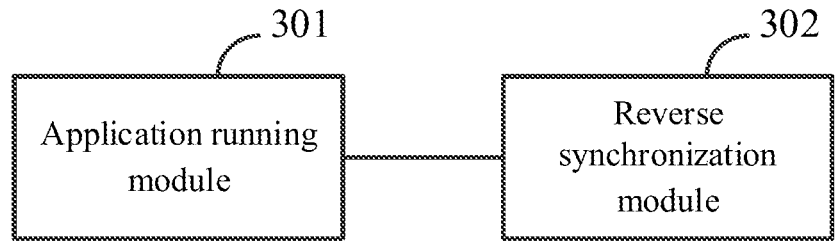
Figures 2, 3:
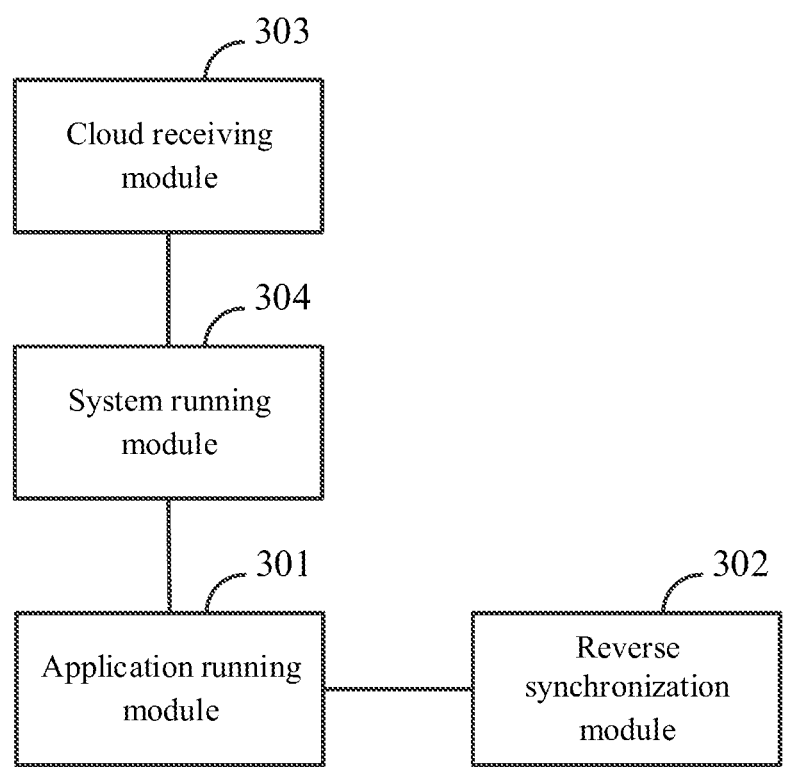
Figure 3:
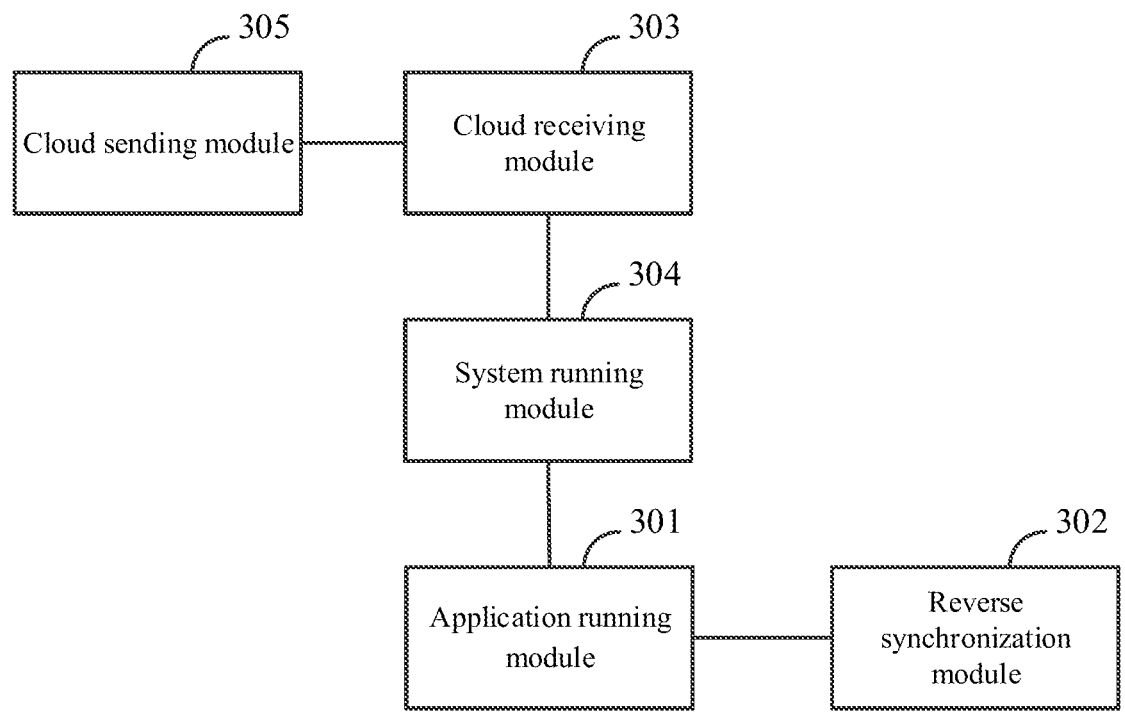

FIG. 3-1 shows a first schematic structural diagram of the apparatus for controlling a robot in the third embodiment of the present disclosure. As shown in the figure, the apparatus for controlling a robot may include:

an application running module 301 configured to run, on a cloud virtual machine pre-running the same operating system as that of a local robot, the same application as that of the local robot, where a file system data of the application is synchronized by the local robot in advance;

a reverse synchronization module 302 configured to reversely synchronize a running result of the application to the local robot.

FIG. 3-2 shows a second schematic structural diagram of the apparatus for controlling a robot in the third embodiment of the present disclosure. As shown in the figure, in implementation, the apparatus may further include:

a cloud receiving module 303 configured to receive the file system data of the application synchronized by the local robot before the same application as that of the local robot is run on the cloud virtual machine pre-running the same operating system as that of the local robot, where the file system data of the application synchronized by the local robot is obtained by creating a file system snapshot of the application in a local operating system by the local robot;

a system running module 304 configured to start the cloud virtual machine, run the same operating system as that of the local robot on the cloud virtual machine and load the file system data.

FIG. 3-3 shows a third schematic structural diagram of the apparatus for controlling a robot in the third embodiment of the present disclosure. As shown in the figure, in implementation, the apparatus may further include:

a cloud sending module 305 configured to send an instruction for synchronizing an application to the local robot before the file system data of the application synchronized by the local robot is received.

A Fourth Embodiment

Figures 1, 4:
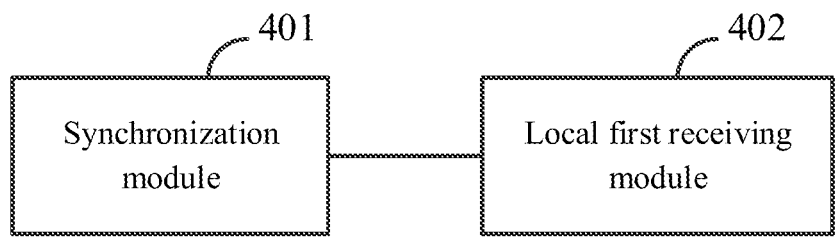
Figures 2, 4:
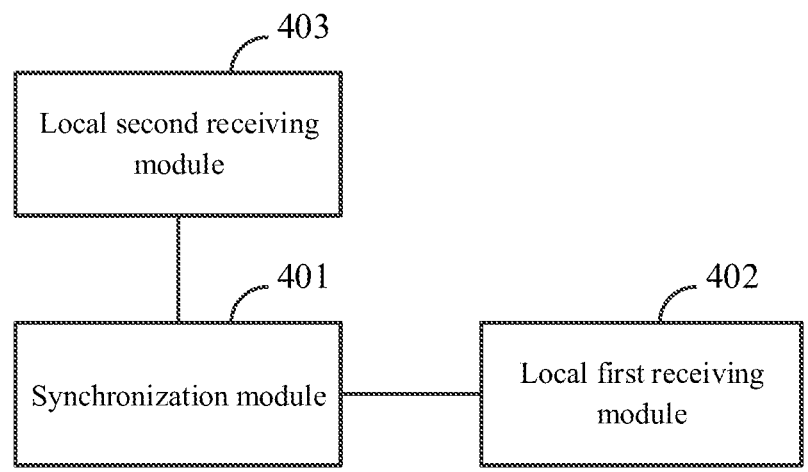
Figures 3, 4:
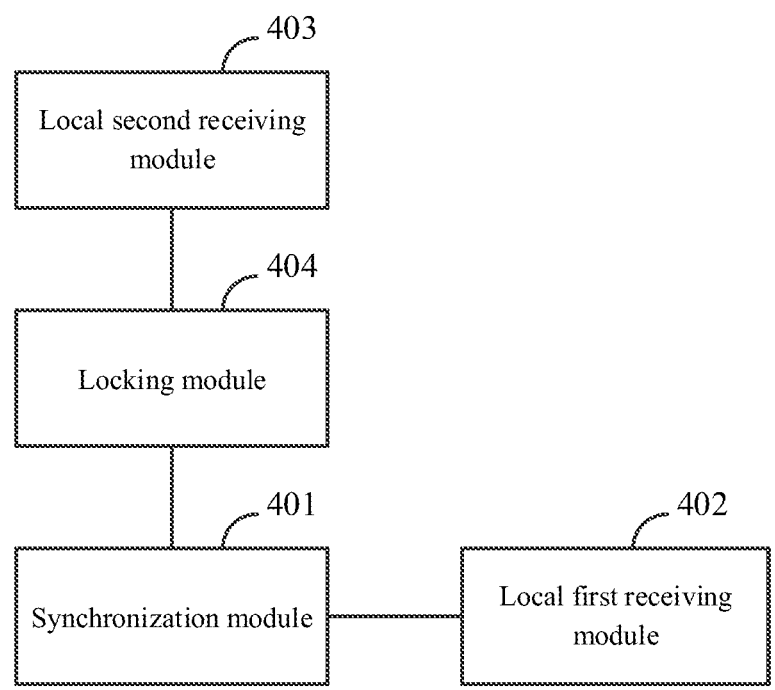
Figure 4:
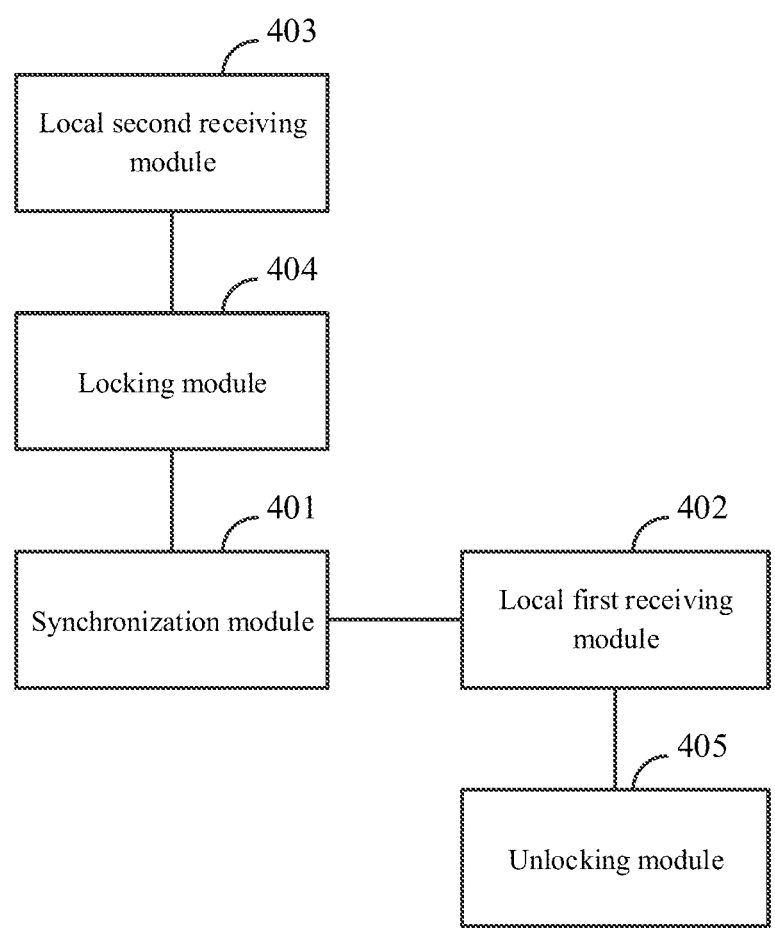

FIG. 4-1 shows a first schematic structural diagram of an apparatus for providing service in a fourth embodiment of the present disclosure. As shown in the figure, the apparatus for providing service may include:

a synchronization module 401, configured to create a file system snapshot of an application in a local operating system, and synchronize a file system data of the application to a cloud robot;

a local first receiving module 402, configured to receive a running result of the application reversely synchronized by the cloud robot.

FIG. 4-2 shows a second schematic structural diagram of the apparatus for providing service in the fourth embodiment of the present disclosure. As shown in the figure, in implementation, the apparatus may further include:

a local second receiving module 403 configured to receive an instruction for synchronizing the application sent by the cloud robot before the file system snapshot of the application is created in the local operating system.

FIG. 4-3 shows a third schematic structural diagram of the apparatus for providing service in the fourth embodiment of the present disclosure. As shown in the figure, in implementation, the apparatus may further include:

a locking module 404, configured to lock the application after the instruction for synchronizing the application sent by the cloud robot is received and before the file system snapshot of the application is created in the local operating system.

FIG. 4-4 shows a fourth schematic structural diagram of the apparatus for providing service in the fourth embodiment of the present disclosure. As shown in the figure, in implementation, the apparatus may further include:

an unlocking module 405 configured to unlock the application after the running result of the application reversely synchronized by the cloud robot is received.

Figures 4, 5:
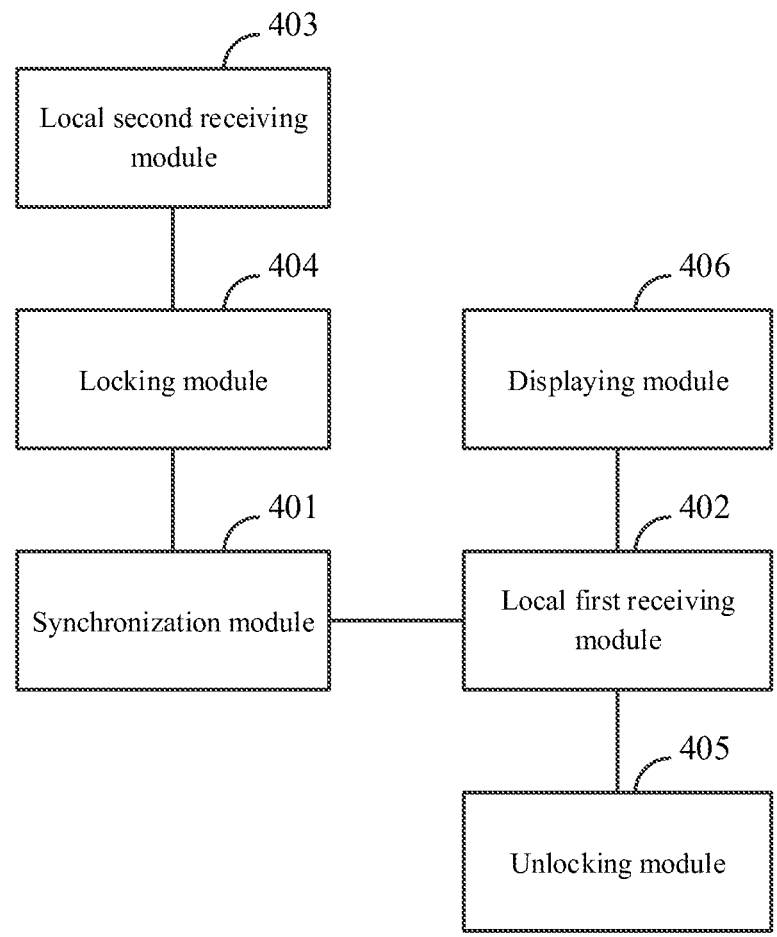
Figure 5:
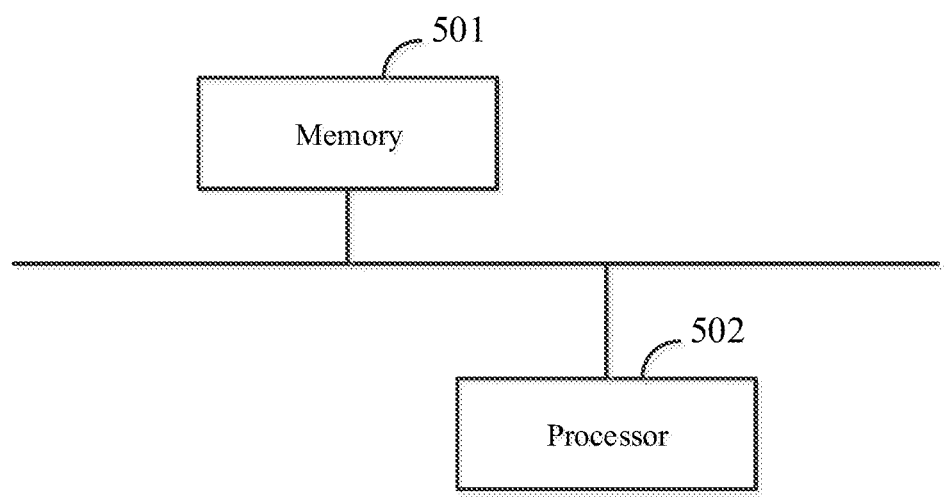

FIG. 4-5 shows a fifth schematic structural diagram of the apparatus for providing service in the fourth embodiment of the present disclosure. As shown in the figure, in implementation, the apparatus may further include:

a displaying module 406, configured to display the running result after the running result of the application reversely synchronized by the cloud robot is received For convenience of description, the forgoing apparatus are divided into modules or units according to functions of each part and the modules or units are described separately. Of course, in implementation of the present disclosure, a function of each module or unit may be implemented in one or more pieces of software or hardware.

A Fifth Embodiment

Based on the same inventive concept, embodiments of the present disclosure further provide an electronic device as described below.

FIG. 5 shows a schematic structural diagram of an electronic device in a fifth embodiment of the present disclosure. As shown in the figure, the electronic device includes a memory 501, one or more processors 502 and one or more modules.

The one or more modules are stored in the memory and configured to be executed by the one or more processors, and the one or more modules include instructions for performing each step in the forgoing method for controlling a robot.

In a specific implementation, the electronic device may be a mobile phone, a pad, a tablet computer, a personal computer (PC), an intelligent robot, or the like.

A Sixth Embodiment

Figure 6:
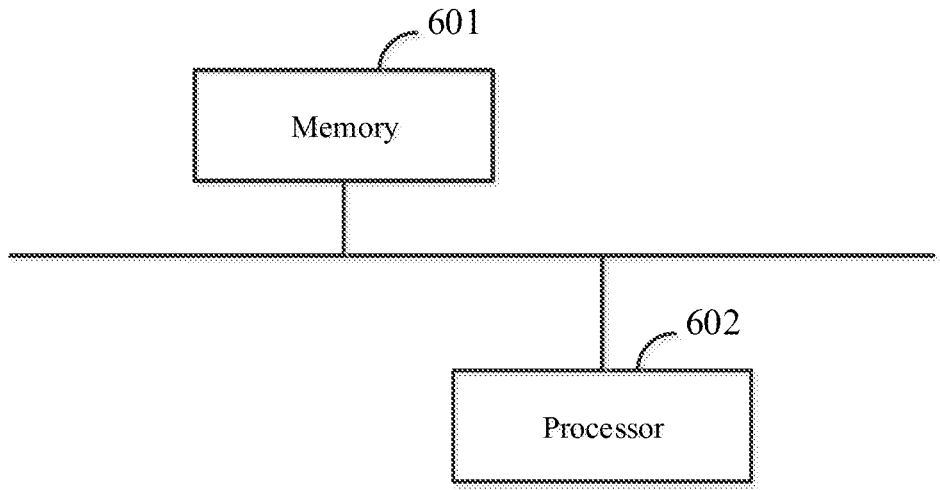
FIG. 6 shows a schematic structural diagram of an electronic device in a sixth embodiment of the present disclosure.

FIG. 6 shows a schematic structural diagram of an electronic device in a sixth embodiment of the present disclosure. As shown in the figure, the electronic device may include a memory 601, one or more processors 602 and one or more modules.

The one or more modules are stored in the memory and configured to be executed by the one or more processors, and the one or more modules include instructions for implementing each step in the forgoing method for providing service.

A Seventh Embodiment

Based on the same inventive concept, embodiments of the present disclosure further provide a computer program product used in combination with an electronic device as described below.

A computer program product provided in this embodiment includes a computer program embedded in a computer-readable storage medium, and the computer program includes instructions for causing an electronic device to perform each step in the method for controlling a robot as the above-mentioned.

An Eighth Embodiment

Based on the same inventive concept, embodiments of the present disclosure further provide another computer program product used in combination with an electronic device as described below.

The another computer program product provided in this embodiment includes a computer program embedded in a computer-readable storage medium, and the computer program includes instructions for causing the electronic device to perform each step in the method for providing service as the above-mentioned.

In order to facilitate implementation of the present disclosure, the following description is made by way of examples.

A Ninth Embodiment

Figure 7:
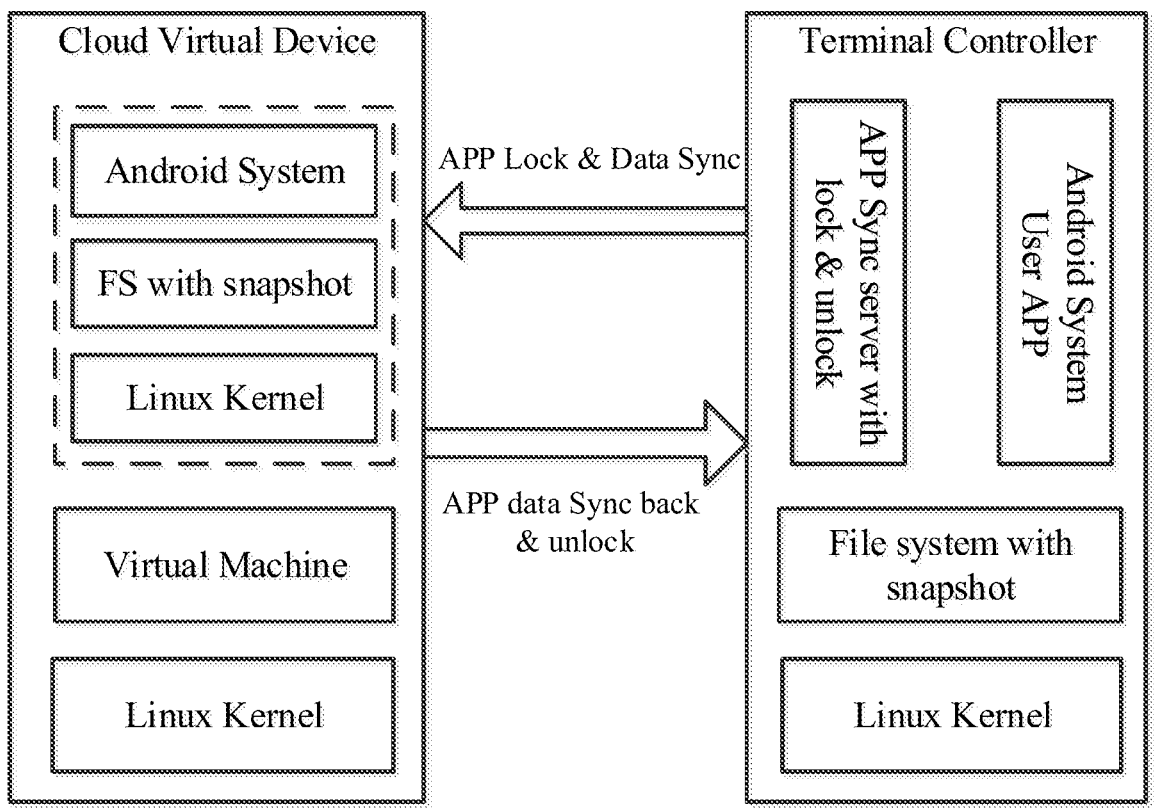
FIG. 7 shows a schematic structural diagram of a robot system in a ninth embodiment of the present disclosure.

FIG. 7 shows a schematic structural diagram of a robot system in a ninth embodiment of the present disclosure. As shown in the figure, the robot system may include a local robot (i.e., a terminal controller) and a cloud robot (i.e., a cloud virtual device).

Herein, the terminal controller runs a Linux system (i.e., a Linux Kernel) and a file system with snapshot. A user space of the terminal controller consists of an Android System, an application (i.e., User APP) and a server for synchronizing the application (i.e., an APP Sync server with lock & unlock).

Corresponding to a software architecture of the terminal controller, the cloud adopts the same software architecture and Linux Kernel, running a software system which is the same as that of the terminal controller on a virtual machine. One cloud server may run one or more cloud virtual machines. The cloud virtual machine may run the Linux Kernel with the same version as that of the Linux Kernel of the terminal controller, directly loading a file system (FS with snapshot) synchronized by the terminal controller, and start running the Android System on the file system.

An operation flow of running a terminal application in the cloud may be as follows:

1) the cloud initiates running the terminal application;
2) after receiving a command, the server for synchronizing the terminal application locks the application to be run (i.e., APP Lock); that is, the terminal may not run the application when the application is locked;
3) The server for synchronizing the terminal application creates a file system snapshot and synchronizes the file system data (i.e., Data Sync) of the application to the cloud server;
4) The cloud server starts the cloud virtual machine, loads the file system data and runs the Android system;
5) A staff may run the terminal application on an Android System in the cloud if needed;

The requirement may be a customized requirement in the cloud or a requirement uploaded to the cloud by the local robot, and the requirement uploaded to the cloud by the local robot may be an instruction sent by a user.

6) After the task is completed, the cloud Android System may reversely synchronize the file system to the terminal (i.e., APP data Sync back).
7) The server for synchronizing the terminal application unlocks the terminal application (i.e., APP unlock), and information such as a running result may be displayed on the terminal at this time.

A Tenth Embodiment

Supposing that a robot serving in a lobby of a bank is pre-installed with a financing management software of the bank (hereinafter referred to as financing management APP). A staff of the bank's back stage initiates an application of the robot through a backstage server, the robot locks the financing management APP after receiving a command, and the financing management application may not be run on a robot terminal side to prevent a user who comes to the bank to handle a business from a misoperation.

The robot creates a file system snapshot and synchronizes a file system data of the financing management APP to the backstage server. The backstage server starts a cloud virtual machine to load the file system data and run the same operating system as that of the robot. The bank staff may run the financing management APP on the cloud virtual machine of the backstage server if needed, complete a basic setting of the financing management APP and a financing management product option, and then reversely synchronize the file system data to the local robot.

When the user who comes to the bank to handle a business needs the robot to provide some financing management products that meet a personal requirement of the user, the robot may send the user's requirement to the backstage server while synchronizing the file system data of the financing management APP to the backstage server. The bank staff run the financing management APP on the cloud virtual machine of the backstage server in accordance with the requirement, determine a financing management product that meets the user's requirement and reversely synchronize a result to the local robot. The local robot displays the running result (a financing management product that meets the user's requirement) reversely synchronized by the backstage server on a display screen for the user to consult, or informs the user by voice or the like.

Those skilled in the art shall understand that embodiments of the present disclosure may be provided as a method, a system, or a computer program product. Therefore, the present disclosure may take a form of an entire hardware embodiment, an entire software embodiment, or an embodiment in which software and hardware are combined. Furthermore, the present disclosure may take the form of a computer program product implemented on one or more computer-usable storage media (including but not limited to a magnetic disk memory, a CD-ROM, an optical memory, etc.) having a computer usable program code.

The present disclosure is described with reference to flowcharts and/or block diagrams of methods, apparatuses (systems), and computer program products in accordance with embodiments of the present disclosure. It shall be understood that each flow and/or block in the flowcharts and/or block diagrams, and combinations of the flows and/or the blocks in the flowcharts and/or block diagrams may be realized by the computer program instructions. These computer program instructions may be provided to a processor of a general-purpose computer, a processor of a special-purpose computer, an embedded processor, or a processor of other programmable data processing device to produce a machine, causing the instructions executed by the processor of the computer or the processor of the other programmable data processing device to produce an apparatus that implements a function specified in one or more flows of the flowcharts and/or one or more blocks of the block diagrams.

These computer program instructions may further be stored in a computer-readable memory that may direct the computer or other programmable data processing device to function in a particular manner, causing the instructions stored in the computer-readable memory to produce a product including an instruction apparatus that realizes a function specified in one or more flows of the flowcharts and/or one or more blocks of the block diagrams.

These computer program instructions may further be loaded onto a computer or other programmable devices, such that a series of operation steps are performed on the computer or the other programmable devices to produce a computer implemented processing, thereby the instructions executed on the computer or other programmable devices provide steps for realizing a function specified in one or more flows of the flowcharts and/or one or more blocks of the block diagrams.

Although preferred embodiments of the present disclosure are described, those skilled in the art may make a further change and modification to these embodiments once they know the basic inventive concept. Therefore, the appended claims are intended to be interpreted as including the preferred embodiments and all changes and modifications that fall within the scope of the present disclosure.

What is claimed is:

1. A method for controlling a robot, comprising:

running, on a cloud virtual machine pre-running the same operating system as that of a local robot, the same application as that of the local robot; wherein a file system data of the application is synchronized by the local robot in advance; and reversely synchronizing a running result of the application to the local robot;

wherein before running the same application as that of the local robot on the cloud virtual machine pre-running the same operating system as that of the local robot, the method further comprising:

receiving the file system data of the application synchronized by the local robot, wherein the file system data of the application synchronized by the local robot is obtained by creating a file system snapshot of the application in a local operating system by the local robot.

2. The method in accordance with claim 1, before running the same application as that of the local robot on the cloud virtual machine pre-running the same operating system as that of the local robot, further comprising:

starting the cloud virtual machine, running the same operating system as that of the local robot on the cloud virtual machine and loading the file system data.

3. The method in accordance with claim 2, before receiving the file system data of the application synchronized by the local robot, further comprising:

sending an instruction for synchronizing an application to the local robot.

4. A method for providing service, comprising:

creating a file system snapshot of an application in a local operating system, and synchronizing a file system data of the application to a cloud robot; and receiving a running result of the application reversely synchronized by the cloud robot.

5. The method in accordance with claim 4, before the creating the file system snapshot of the application in the local operating system, further comprising:

receiving an instruction for synchronizing an application sent by the cloud robot.

6. The method in accordance with claim 5, after the receiving the instruction for synchronizing an application sent by the cloud robot and before the creating the file system snapshot of the application in the local operating system, further comprising:

locking the application.

7. The method in accordance with claim 4, after the receiving the running result of the application reversely synchronized by the cloud robot, further comprising:

unlocking the application.

8. The method in accordance with claim 4, after the receiving the running result of the application reversely synchronized by the cloud robot, further comprising:

displaying the running result.

9. An electronic device, comprising: a memory, one or more processors and one or more modules;

wherein the one or more modules are stored in the memory and configured to be executed by the one or more processors, and the one or more modules comprise instructions for performing steps in a method for controlling a robot;

wherein the methods comprises:

running, on a cloud virtual machine pre-running the same operating system as that of a local robot, the same application as that of the local robot; wherein a file system data of the application is synchronized by the local robot in advance; and reversely synchronizing a running result of the application to the local robot, before running the same application as that of the local robot on the cloud virtual machine pre-running the same operating system as that of the local robot, the method further comprising:

receiving the file system data of the application synchronized by the local robot; wherein the file system data of the application synchronized by the local robot is obtained by creating a file system snapshot of the application in a local operating system by the local robot.

10. The electronic device in accordance with claim 9, before running the same application as that of the local robot on the cloud virtual machine pre-running the same operating system as that of the local robot, the method further comprising:

starting the cloud virtual machine, running the same operating system as that of the local robot on the cloud virtual machine and loading the file system data.

11. The electronic device in accordance with claim 9, before receiving the file system data of the application synchronized by the local robot, the method further comprising:

sending an instruction for synchronizing an application to the local robot.

12. An electronic device, comprising: a memory, one or more processors and one or more modules;

wherein the one or more modules are stored in the memory and configured to be executed by the one or more processors, and the one or more modules comprise instructions for performing steps in a method for providing service in accordance with claim 4.

13. The electronic device in accordance with claim 12, before the creating the file system snapshot of the application in the local operating system, the method further comprising:

receiving an instruction for synchronizing an application sent by the cloud robot.

14. The electronic device in accordance with claim 13, after the receiving the instruction for synchronizing an application sent by the cloud robot and before the creating the file system snapshot of the application in the local operating system, the method further comprising:

locking the application.

15. The electronic device in accordance with claim 12, after the receiving the running result of the application reversely synchronized by the cloud robot, the method further comprising:

unlocking the application.

16. The electronic device in accordance with claim 12, after the receiving the running result of the application reversely synchronized by the cloud robot, the method further comprising:

displaying the running result.

* * * * *